H. G. BALLOU.
PROCESS OF AND MOLD FOR REBUILDING TIRES.
APPLICATION FILED NOV. 18, 1919.
1,374,805.
Patented Apr. 12, 1921.
2 SHEETS—SHEET 1.
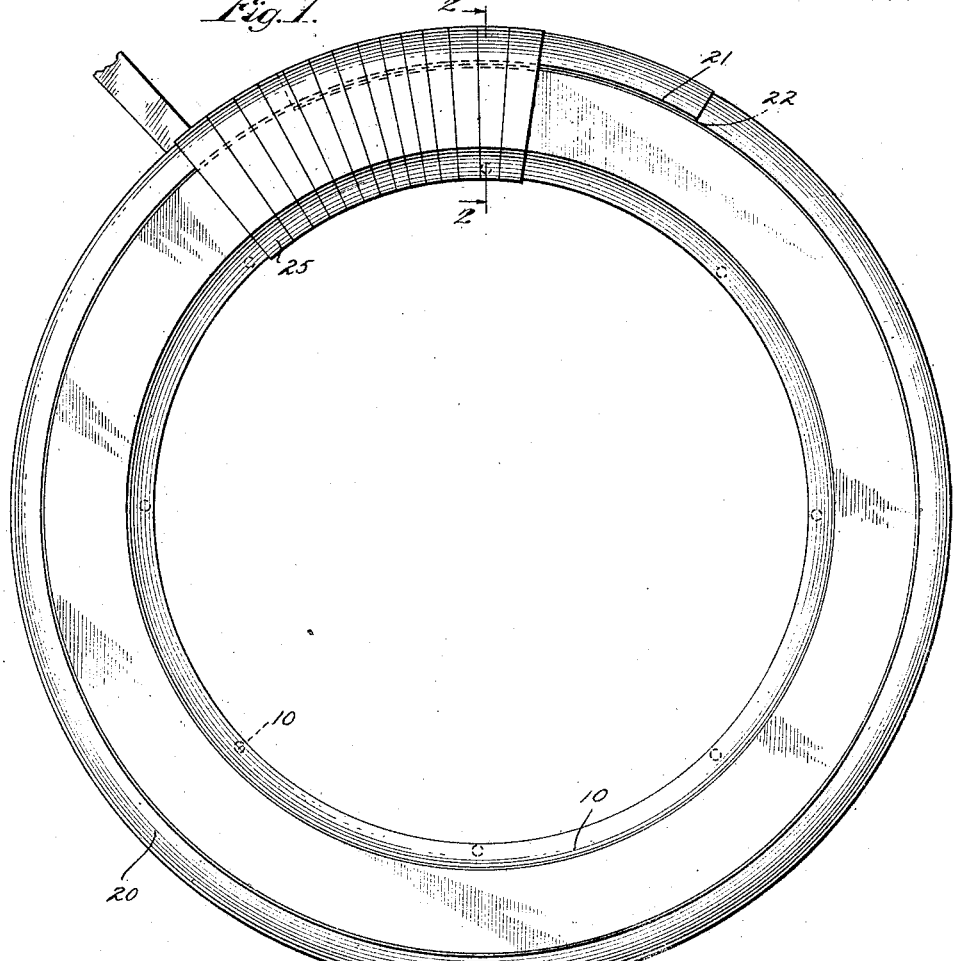
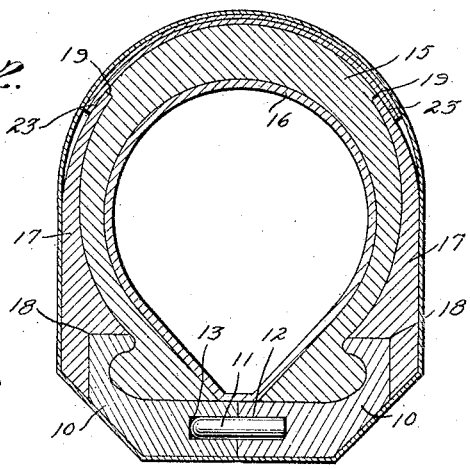
INVENTOR
H.G. BALLOU,
BY
ATTORNEYS H. G. BALLOU.
PROCESS OF AND MOLD FOR REBUILDING TIRES.
APPLICATION FILED NOV. 18, 1919.
1,374,805.
Patented Apr. 12, 1921.
2 SHEETS—SHEET 2.
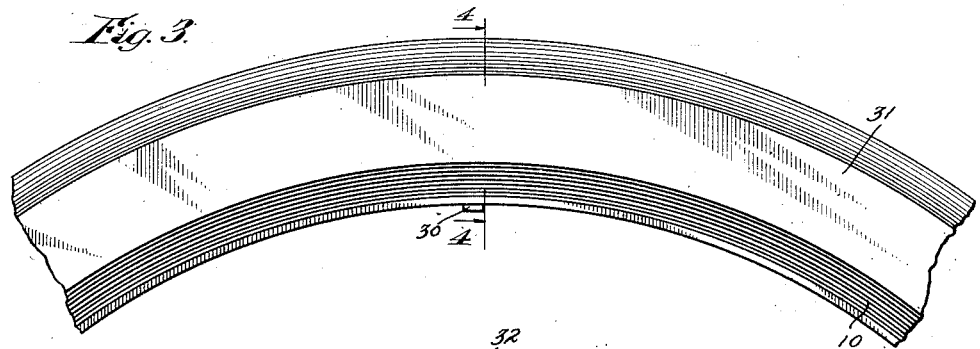
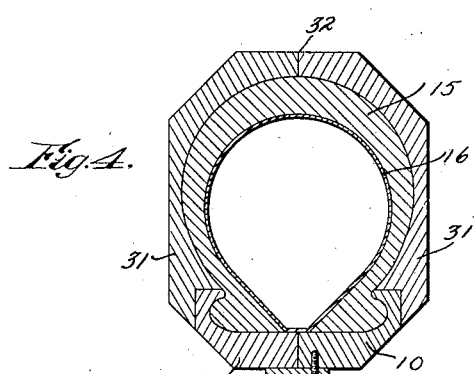
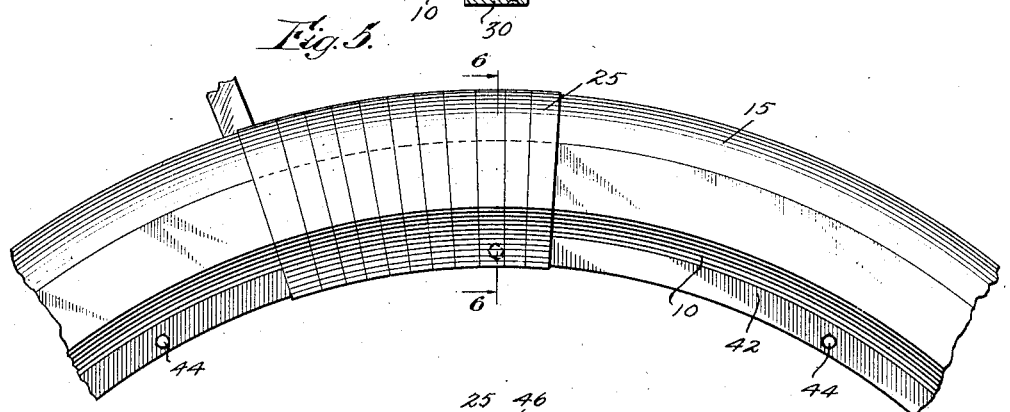
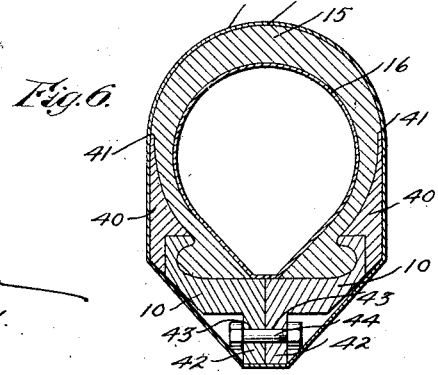
INVENTOR
H. G. BALLOU,
BY
ATTORNEYS

UNITED STATES PATENT OFFICE.

HAROLD G. BALLOU, OF LOS ANGELES, CALIFORNIA.

PROCESS OF AND MOLD FOR REBUILDING TIRES.

1,374,805.  Specification of Letters Patent.  Patented Apr. 12, 1921.

Application filed November 18, 1919. Serial No. 338,854.

*To all whom it may concern:*

Be it known that I, HAROLD G. BALLOU, a citizen of the United States, and a resident of Los Angeles, in the county of Los Angeles and States of California, have invented a new and Improved Process of and Mold for Rebuilding Tires, of which the following is a full, clear, and exact description.

The present invention relates to new and useful improvements in processes of and apparatus for treating rubber tires, and it pertains more particularly to apparatus for rebuilding and retreading old and used tire casings.

The primary object of the invention is to provide an apparatus by which a progressive process may be carried out.

A further object of the invention is to so construct a tire mold that in addition to a new tread being formed on the tire treated, stock may be applied to the side walls of said tire, thus providing for the rebuilding of a complete tire as distinguished from the ordinary retreading process.

A further object of the invention is to provide a retreading rim, which consists of a plurality of bead-forming elements that are adapted to form a part of the curing mold.

The invention has for a further object to provide an inflatable continuous core by means of which the casing treated is well rounded to form.

A still further object of the invention is to provide a retreading rim so constructed that it overlaps the side forming mold members to prevent disfiguration of the tire by the wrapping element with which the several parts are maintained in position during the cooking or curing process.

With the above and other objects in view, reference is had to the accompanying drawings in which—

Figure 1 is a side elevation of one form of the mold showing the method in which the same is wrapped to hold the several parts together;

Fig. 2 is a transverse sectional view taken on the line 2—2 of Fig. 1;

Fig. 3 is a detail fragmentary view in elevation of a modified form;

Fig. 4 is a sectional view taken on the line 4—4 of Fig. 3;

Fig. 5 is a detail segmental elevation of a still further modified form of the invention, and Fig. 6 is a transverse sectional view taken on the line 6—6 of Fig. 5.

In the preferred form of the invention, the reference character 10 designates the bead-forming rim on which the tire to be treated is positioned. This rim comprises two half sections which when secured together by means of dowel pins or the like 11, are adapted to form a rim similar in interior contour to the rim on which the tire is secured when in use. These dowel pins 11 are rigidly secured to one of the rim members, as indicated by the reference character 12, the other rim member being provided with an opening 13, adapted to receive the free projecting ends of the dowel pins. The reference character 15 designates the casing upon which the operation is carried out, and mounted interiorly of said casing is a pneumatic tube 16. This tube 16 is inflated to the necessary pressure to form the tire in well-rounded cross sectional form. The reference character 17 designates side-wall-forming mold members, and these members 17 are cut out with right-angularly disposed walls 18 adapted to receive the upper and outer faces of the rim sections 10. These side members 17 extend upwardly around the side walls of the tire casing 15 and terminate at a point indicated by the reference character 19.

The tread-forming rim is designated by the reference character 20, and comprises a strip of relatively thin metal, the ends of which overlap as indicated by the reference characters 21 and 22 in Fig. 1. The side edges of this tread-forming rim are adapted to overlie the outer edges of the side members 17, as designated by the reference character 23.

In use the pneumatic core 16 is positioned within the casing 15 to be treated and said casing is placed upon the rim sections 10. These rim sections 10 are temporarily secured together in any desired manner, such as by clamps or the like, and stock employed to build up the side walls of the casing or carcass is applied in the usual manner. The side members 17 are now positioned, after which the stock employed to rebuild the tread of the carcass is applied, after which the tread-forming rim is positioned about the casing in such a manner that its side edges overlap the outer edge of the side members 17 as heretofore stated. After the several parts have been thus positioned, the tape 25 is wrapped around the several elements throughout the circumference of the tire, after which the same is subjected to the cooking or curing process commonly employed in this art.

After the curing or cooking operation has been completed, the tape 25 is removed and the several mold sections are disassembled, leaving the tire carcass in its rebuilt form without the disfigurations commonly caused by a wrapping of the tape in direct contact with the outer surface of the tire casing.

In the form of the invention shown in Figs. 3 and 4, the rim sections 10 are secured together by means of suitable catches 30. In this form of the invention, the side members 31 are extended outwardly and completely inclose the tire casing, said side members 31 meeting at the outer periphery of the mold, as indicated by the reference character 32.

In the form of the invention shown in Figs. 5 and 6, the side members 40 terminate considerably below the tread portion of the casing 15, as indicated by the reference character 41. In this form of the invention, the rim sections 10 are provided with depending lugs 42, and said lugs are in turn provided with alined perforations 43, through which a bolt 44 is passed for securing the sections 10 together. In this embodiment of the invention, the tape 25 is wrapped around the rim sections 10 and the side sections 40 and in contact with the casing 15, as indicated by the reference character 46.

From the foregoing description, it will be apparent that the present invention provides a collapsible mold in which the several parts are retained in position by means of a wrapping tape, and that in addition to the rim sections of the mold forming the support for the tire carcass during the building up process, the same are adapted to form a portion of the mold in which the carcass is cooked during the process of curing the built-up stock of said carcass.

I claim:

1. A mold for rebuilding tires comprising a plurality of bead-forming sections, means for retaining said bead-forming sections together, a plurality of side-body-forming sections, and an expansible tread-forming element adapted for interengagement with the side-body-forming elements to secure the latter in operative position with respect to the bead-forming sections and the tire.

2. A mold for rebuilding tires comprising a plurality of bead-forming sections, means for retaining said bead-forming sections together, a plurality of side-body-forming sections, an expansible tread-forming element adapted for interengagement with the side-body-forming sections, and means for retaining said sections in proper tire-building relation, substantially as described.

3. A mold for rebuilding tires comprising a plurality of bead-forming sections, means retaining said bead-forming sections together, a plurality of side-body-forming sections, an expansible tread-forming section comprising a relatively thin metallic member so positioned as to have its side edges overlie the side-body-forming sections to retain them in position, and a tape adapted to be wrapped around and inclose each of said mold sections to form a complete tire-building mold, substantially as described.

HAROLD G. BALLOU.